Patented May 23, 1933

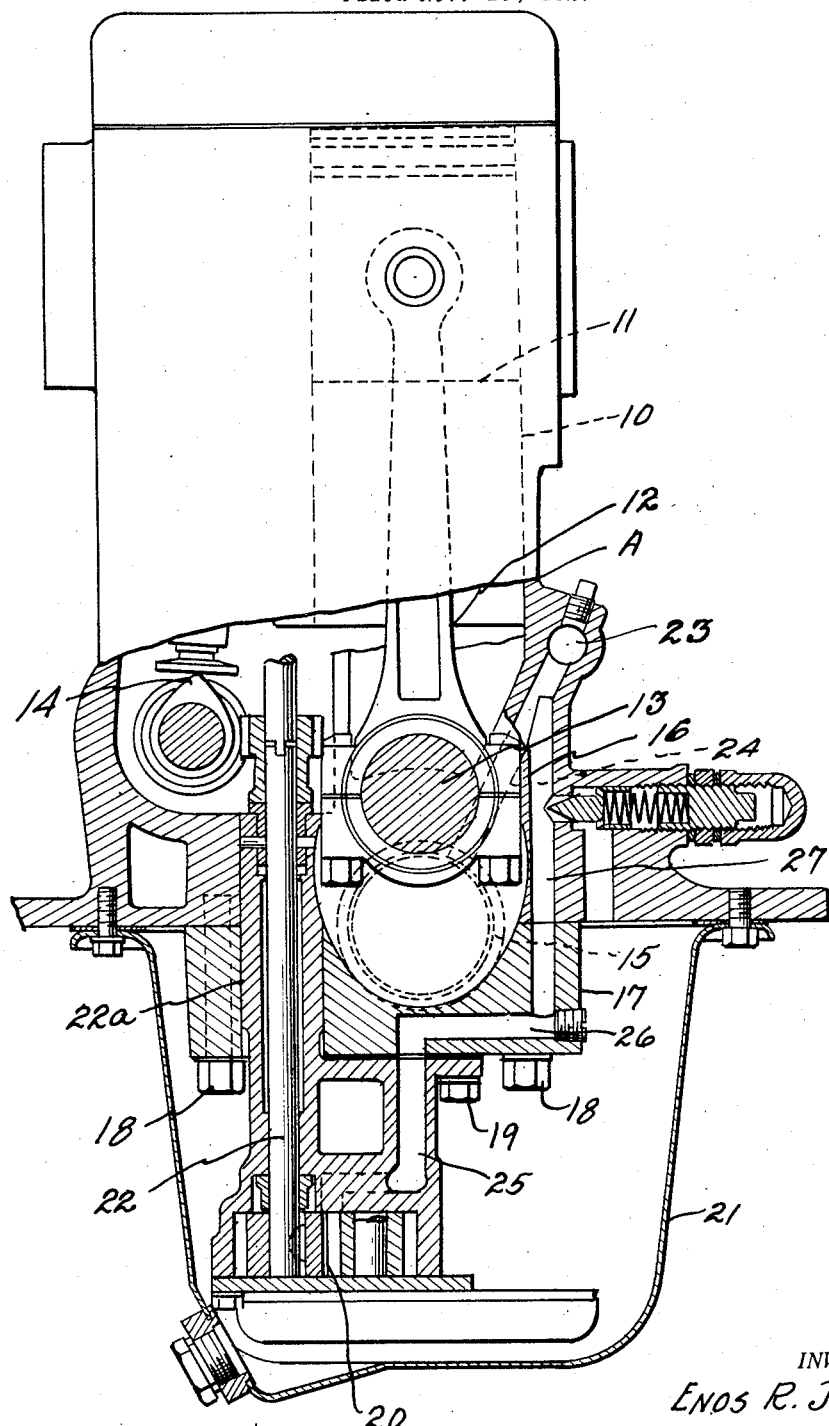

1,909,965

UNITED STATES PATENT OFFICE

ENOS R. JACOBY, OF DETROIT, MICHIGAN, ASSIGNOR TO CONTINENTAL MOTORS CORPORATION, OF DETROIT, MICHIGAN, A CORPORATION OF VIRGINIA

INTERNAL COMBUSTION ENGINE

Application filed November 16, 1927. Serial No. 233,535.

This invention relates to internal combustion engines and refers more particularly to those portions of the engine which are associated with the lubricating system.

One object of my invention resides in an engine construction eliminating the customary lubrication or oil pipes in the supply line from the oil pump to the oil header. My invention eliminates the heretofore difficulties resulting from the use of oil conducting pipes which frequently become loose, resulting in oil leakage and dirt accumulations. My invention further provides a construction for conducting the oil as desired, which construction is more simple and capable of manufacture at less cost than prior devices for the same general purpose.

Another feature of my invention resides in utilizing one or more of the crankshaft bearing caps as an oil conducting means. A still further feature provides for conveniently mounting the oil pump on one of the crankshaft bearing caps, with registering oil conduits from the pump to the oil header formed by drilling the crankshaft bearing cap and the main cylinder casting.

Further features of my invention reside in the novel combination and arrangements of parts, more particularly hereinafter described and claimed.

Referring to the accompanying drawing which illustrates one embodiment of my invention, the single figure represents a sectional elevation view of an engine showing my improved oil conducting means.

Reference character A represents the cylinder block or main cylinder casting which is customarily formed with a plurality of cylinders 10 having their axes disposed in a plane extending longitudinally of the cylinder block. Associated with each cylinder is the usual piston 11, connecting rod 12, crankshaft 13, and a suitable valve actuating mechanism illustrated at 14. The foregoing parts are well known in the art and may be of any suitable construction.

The crankshaft 13 may be formed with spaced bearing portions, one being illustrated at 15. Such bearing portion is journaled in the crankcase web 16, and has a bearing cap 17 cooperating therewith and with the crankshaft bearing portion 15, fasteners 18 serving to removably hold the bearing cap in position. Positioned beneath the bearing cap 17 and secured thereto by fasteners 19 is an oil pump 20, the pump being located in the crankcase pan 21 where it can function to pump crankcase oil usually stored in the pan. The oil pump may be actuated by the driving shaft 22 extending through and piloting in the bearing cap by reason of the pump housing extension 22$^a$. The shaft 22 is driven directly, or more commonly indirectly, from the engine crankshaft.

The cylinder block A and the downwardly extending crankcase portion constitute a main engine frame, these parts being either formed separately or as one casting as illustrated.

The cylinder block A is provided with the oil header 23 extending longitudinally of the engine and adapted to distribute oil under pressure to the various engine parts such as the crankshaft bearings 15, the webs 16 for this purpose being drilled to form oil conduits 24.

The pump housing is formed with a drilled pressure discharge conduit 25 communicating with the drilled conduit 26 in the bearing cap 17. The conduit 26 in turn communicates with the conduit 27 formed in the cylinder block, the header 23 receiving the oil under pressure from the conduit 27.

In operation the pump 20 forces oil under pressure from the pan 21 through the communicating conduits 25, 26, and 27 to the header 23. From the header the oil is distributed to the various bearings and engine parts to be lubricated.

It will be noted that my invention eliminates the necessity for oil pipes usually connected in the supply line between the oil pump and distributing header. Furthermore I have provided a compact and novel arrangement for securely mounting the oil pump in position within the crank case pan.

What I claim as my invention is:

1. The combination with an engine having a main frame, crankshaft, with associated piston and connecting rod, said main frame being formed with a crankshaft bearing, a bearing cap cooperating with the crankshaft bearing, an oil pump, the main frame being formed with an oil delivery conduit, and the bearing cap being formed with an oil conduit in registration with the pump outlet for receiving oil under pressure from the pump and delivering the oil to said main frame oil conduit.

2. The combination with an engine having a main frame, crankshaft, with associated piston and connecting rod, a bearing cap for a bearing portion of the crankshaft and secured to the main frame, an oil pan, a pump device supported beneath and by the bearing cap, an oil header, the main frame, bearing cap, and pump device being formed with communicating oil conduits in direct registration with each other for supplying oil under pressure from the pump to the header.

3. The combination with an engine having a main frame, crankshaft, with associated piston and connecting rod, a bearing cap formed with an internal oil conducting passage, a pump delivering oil to said passage, and an oil header receiving oil therefrom.

4. The combination with an engine having a main frame, crankshaft, with associated piston and connecting rod, a bearing cap for a bearing portion of the crankshaft, an oil pump secured to the bearing cap, and a pump drive shaft extending through said bearing cap.

5. The combination with an engine having a main frame, crankshaft, with associated piston and connecting rod, a bearing cap for a bearing portion of the crankshaft, an oil pump secured to the bearing cap, and having a portion thereof extending through the bearing cap, and a pump drive shaft associated with said extension.

6. An engine comprising in combination with a main frame with associated cylinder, piston, crankshaft, and connecting rod between the piston and crankshaft, a bearing and cooperating bearing cap for the crankshaft, said bearing cap having an internal oil conducting conduit extending from the under face of the bearing cap to the upper face thereof to one side of the crankshaft bearing, and an oil pump structure secured to the said bearing cap under face and provided with a discharge conduit aligned with said bearing cap conduit.

7. An engine comprising in combination with a main frame with associated cylinder, piston, crankshaft, and connecting rod between the piston and crankshaft, a bearing and cooperating bearing cap for the crankshaft, said bearing cap having an internal oil conducting conduit extending from the under face of the bearing cap to the upper face thereof to one side of the crankshaft bearing, and an oil pump structure secured to the said bearing cap under face and provided with an internal conduit extending to the upper face of the pump structure in alignment with the said bearing cap conduit.

8. An engine comprising in combination with a main frame with associated cylinder, piston, crankshaft, and connecting rod between the piston and crankshaft, a bearing and cooperating bearing cap for the crankshaft, an oil pump structure, means securing said pump structure to said bearing cap, said bearing cap having an opening extending vertically therethrough, said pump structure having a pilot extending into said bearing cap opening, and a pump drive shaft in said pilot.

9. An engine comprising in combination with a main frame with associated cylinder, piston, crankshaft, and connecting rod between the piston and crankshaft, a bearing and cooperating bearing cap for the crankshaft, an oil pump structure, means securing said pump structure to said bearing cap, said bearing cap having an opening extending vertically therethrough, said pump structure having a pilot extending into said bearing cap opening, and a pump drive shaft in said pilot, said bearing cap having an oil conduit therethrough receiving oil from said pump.

10. An engine comprising in combination with a main frame with associated cylinder, a piston, a crankshaft and a connecting rod between the piston and crankshaft, a bearing and cooperating bearing cap for the crankshaft, said main frame and bearing cap having cooperating oil passages forming a substantially continuous oil conduit, and an oil pump structure secured to the underside of said bearing cap and provided with an oil delivery conduit in direct registration with the bearing cap oil passage.

11. An engine comprising in combination with a main frame with associated cylinder, a piston, a crankshaft and a connecting rod between the piston and crankshaft, a bearing and cooperating bearing cap for the crankshaft, said main frame and bearing cap having cooperating oil passages forming a substantially continuous oil conduit, said main frame provided with lateral oil passages connecting the crankshaft bearing with said oil conduit, and an oil pump structure secured to the underside of said bearing cap and provided with an oil delivery conduit in direct registration with the bearing cap oil passage.

In witness whereof, I hereunto subscribe my name this 8th day of November, A. D. 1927.

ENOS R. JACOBY.